(12) United States Patent
Goetsch

(10) Patent No.: US 10,077,867 B2
(45) Date of Patent: Sep. 18, 2018

(54) CARABINER WITH VARIABLE MOUNTING POSITIONS RELATIVE TO A FIXED SUPPORT

(71) Applicant: Stephen Goetsch, Burbank, CA (US)

(72) Inventor: Stephen Goetsch, Burbank, CA (US)

( * ) Notice: Subject to any disclaimer, the term of this patent is extended or adjusted under 35 U.S.C. 154(b) by 146 days.

(21) Appl. No.: 15/249,222

(22) Filed: Aug. 26, 2016

(65) Prior Publication Data
US 2017/0023176 A1    Jan. 26, 2017

Related U.S. Application Data

(60) Provisional application No. 62/231,966, filed on Jul. 20, 2015.

(51) Int. Cl.
*F16M 13/02*    (2006.01)
*F16B 45/02*    (2006.01)

(52) U.S. Cl.
CPC .......... *F16M 13/022* (2013.01); *F16B 45/02* (2013.01)

(58) Field of Classification Search
CPC . F16M 13/022; F16B 45/02; Y10T 24/45325; Y10T 24/45361; Y10T 24/45372; Y10T 24/45435
See application file for complete search history.

(56) References Cited

U.S. PATENT DOCUMENTS

| | | | | |
|---|---|---|---|---|
| 465,530 A | * | 12/1891 | Kirby ...................... | B62C 9/00 24/601.5 |
| 479,465 A | * | 7/1892 | Ryan ..................... | A44C 5/2057 24/599.2 |
| 4,590,882 A | * | 5/1986 | Murphy .................. | F16G 15/04 114/108 |
| 8,646,820 B2 | * | 2/2014 | Knox ..................... | F16B 45/02 294/82.1 |
| 9,631,771 B1 | * | 4/2017 | Abels .................... | F16M 13/022 |
| 2002/0174815 A1 | * | 11/2002 | Tylaska .................. | F16B 45/02 114/108 |
| 2003/0168484 A1 | * | 9/2003 | Gates .................... | A47B 81/005 224/401 |
| 2005/0144730 A1 | * | 7/2005 | Barber .................... | B25B 7/22 7/138 |
| 2009/0079213 A1 | * | 3/2009 | Robins ................... | F16B 45/02 294/82.22 |
| 2015/0069775 A1 | * | 3/2015 | Knox ..................... | F16B 45/00 294/82.15 |

* cited by examiner

*Primary Examiner* — Robert Sandy
*Assistant Examiner* — Rowland Do
(74) *Attorney, Agent, or Firm* — James A. Italia; Italia IP

(57) ABSTRACT

A carabiner that provides for variable mounting positions relative to a stationary environmental support. The carabiner includes a loop including a gate movable to pass objects to the interior of the loop, and a mounting enabling connection of the carabiner to an environmental object while maintaining orientation of the loop relative to the environmental object. The mounting locks the loop in different orientations relative to the environmental object. The mounting may include a plurality of sockets for receiving rods, and a setscrew to lock a rod within the socket.

5 Claims, 6 Drawing Sheets

CARABINER WITH VARIABLE MOUNTING POSITIONS RELATIVE TO A FIXED SUPPORT

CROSS REFERENCE TO RELATED APPLICATION

This application claims the benefit of the filing date under 35 USC 119(e) of the filing date of U.S. Provisional Application Ser. No. 62/231,966, filed on Jul. 20, 2015, which was revived pursuant to 37 CFR 1.78b for the purpose of the present claim of priority, the contents of which are incorporated herein by reference.

FIELD OF THE DISCLOSURE

The present disclosure relates to supports, and more particularly, to a carabiner which may be solidly fixed to an environmental support such that it remains at one selected orientation relative to environmental objects.

BACKGROUND

Diverse elongated rod-like or pole-like objects must from time to time be placed in a particular location and orientation suitable for a user to pick up these objects for use. In particular, in the field of photography, it is desirable to have objects such as extensions of support stands made ready for selection or use at a particular location proximate cameras, lighting equipment, and other objects, so that they may be readily retrieved and installed.

In such situations, it may be desirable to have the retrievable objects loosely held rather than tightly secured, for example, to facilitate rapid retrieval. This presents contradictory requirements in practice. Various gripping devices such as clamps have been developed to secure an object in a stationary or fixed way. Yet a clamp is not suitable for loosely holding an object. In a hypothetical solution, a ring secured in a horizontal plane may answer the above need. Yet it may also be desirable to provide a readily deflected gate to enable the held object to be removed horizontally, rather than withdrawing the object along a linear path parallel to the axis of the opening of the ring. A carabiner provides this option. Yet carabiners are not suited for fixed mounting to the environment.

Further, it would be beneficial to have a securement device for rod-like devices, such as a monopod for expensive equipment that was available to a user as an alternative safe and secure option rather than just laying the expensive item on the ground or on a chair.

There remains a need for an interface device to hold retrievable objects loosely, conveniently, and safely to stationary environmental supports.

SUMMARY

The disclosed concepts address the above stated situation by providing a carabiner capable of mounting in fixed or stationary manner to an environmental object.

It is an object to provide improved elements and arrangements thereof by apparatus for the purposes described which is inexpensive, dependable, and fully effective in accomplishing its intended purposes.

These and other objects will become readily apparent upon further review of the following specification and drawings.

BRIEF DESCRIPTION OF THE DRAWINGS

Various objects, features, and attendant advantages of the disclosed concepts will become more fully appreciated as the same becomes better understood when considered in conjunction with the accompanying drawings, in which like reference characters designate the same or similar parts throughout the several views, and wherein.

DETAILED DESCRIPTION

Figure 1:
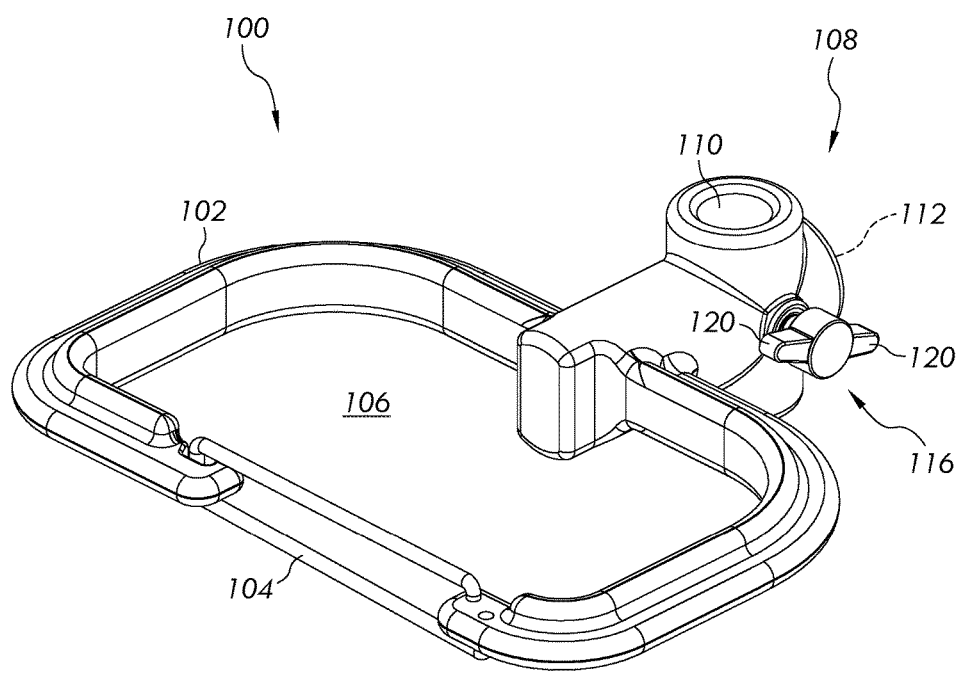
FIG. 1 is a perspective view of a carabiner, according to at least one aspect of the disclosure.
Figure 3A:
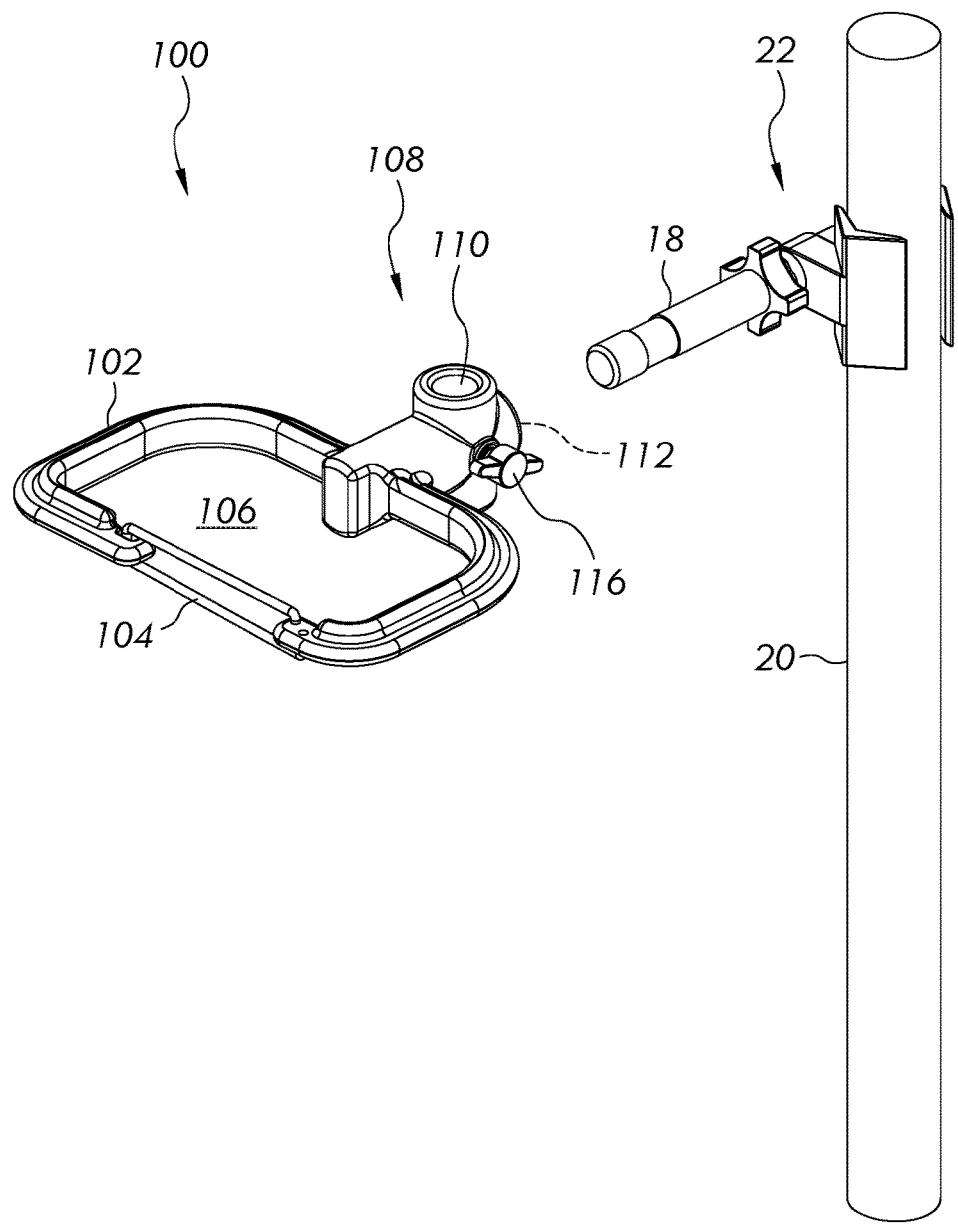
FIG. 3A is an exploded environmental view of the carabiner of FIG. 1, showing a mounting option.
Figure 3B:
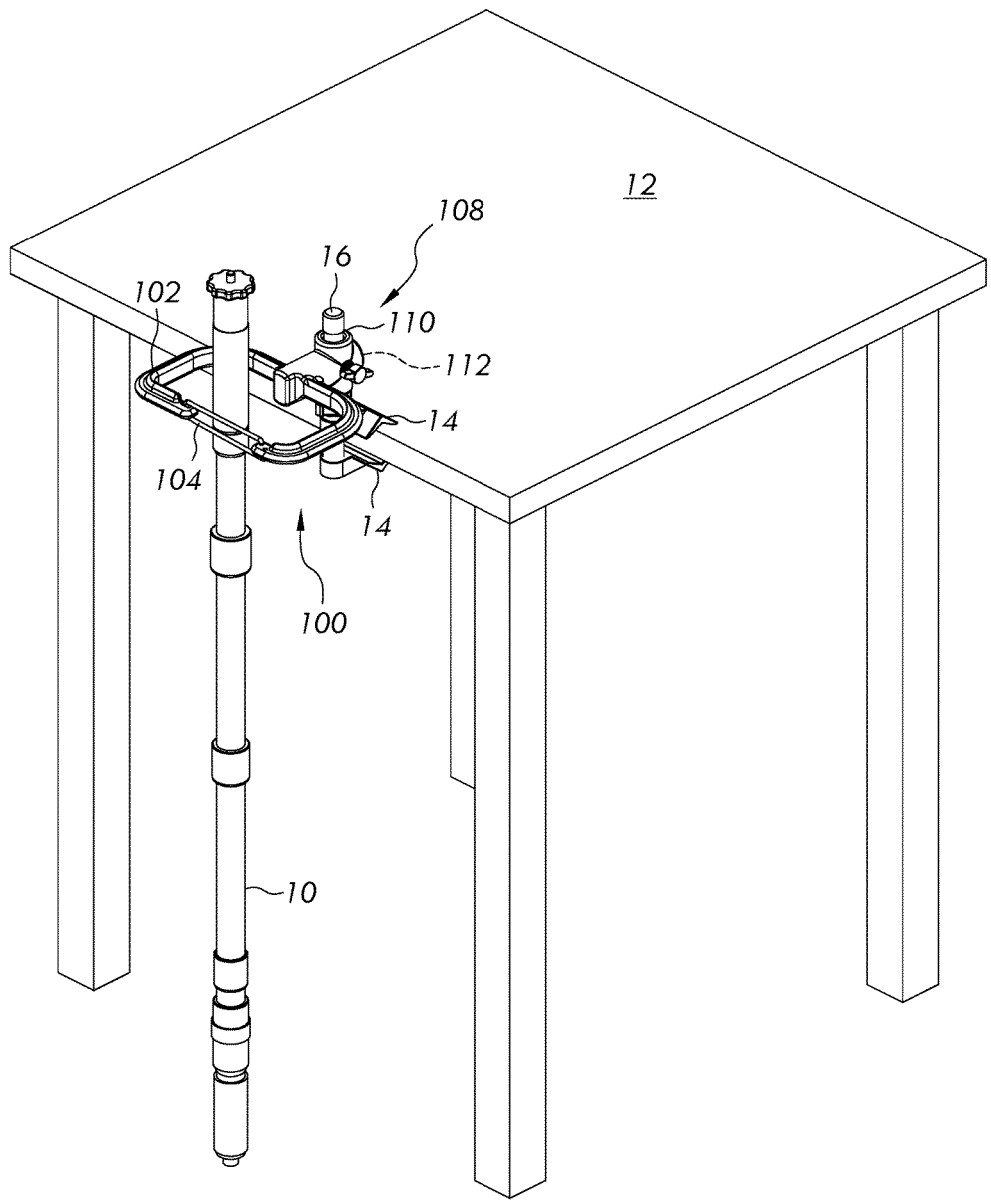
FIG. 3B is an environmental perspective view of the carabiner of FIG. 1, showing a second mounting option.
Figure 4:
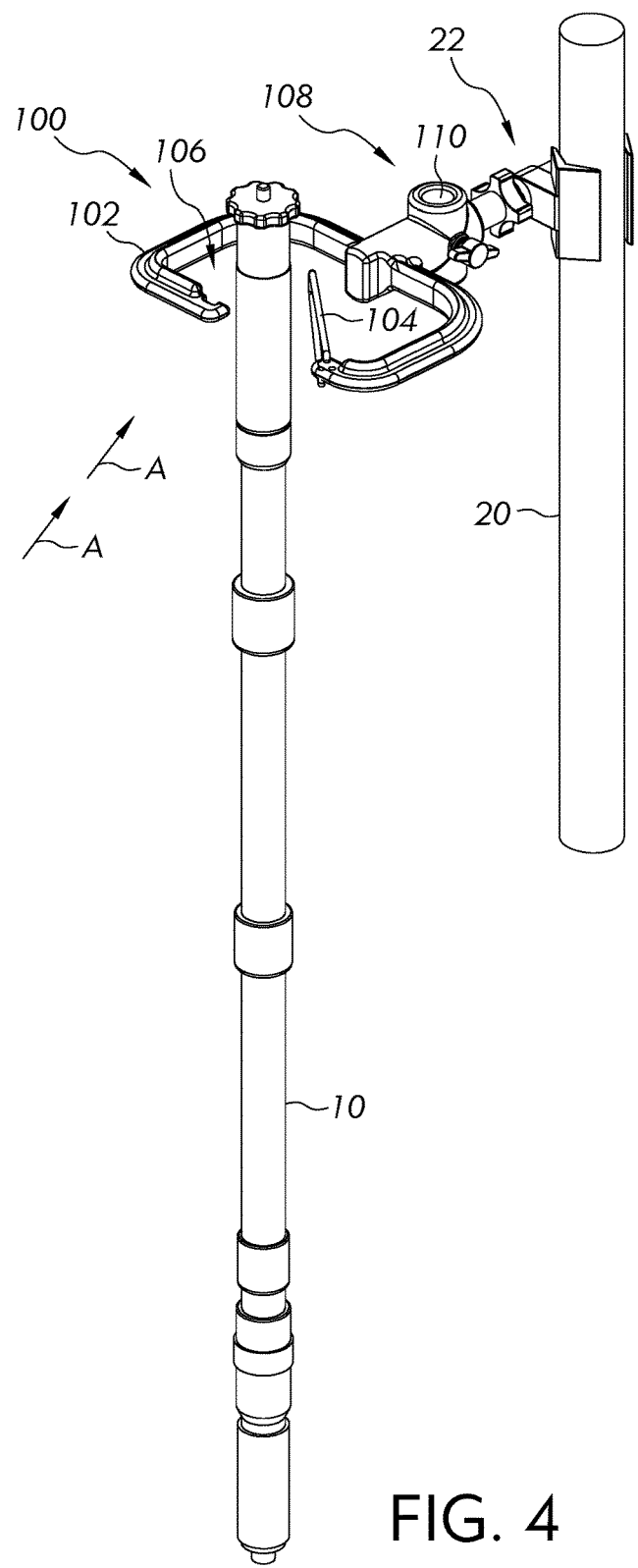
FIG. 4 is an environmental perspective view of the subject matter of FIG. 3A, illustrating operation of a gate of the carabiner.
Figure 5:
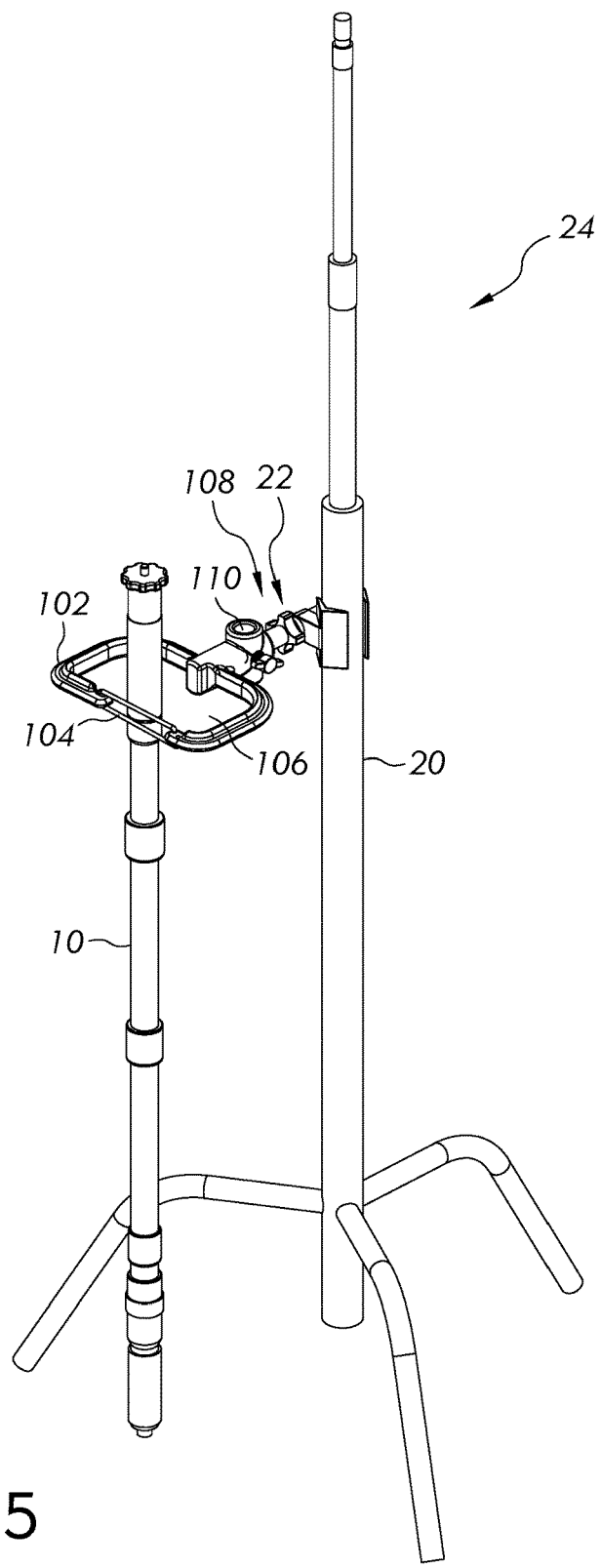
FIG. 5 is an environmental perspective view expanding the showing of FIG. 3A.

Referring first to FIG. 1, according to at least one aspect of the disclosure, there is shown a carabiner 100 providing variable mounting positions relative to a stationary support (the latter shown in FIGS. 3A, 3B, 4, and 5). Carabiner 100 comprises a loop 102 including a gate 104 movable to pass objects (as shown in FIGS. 3A, 4, and 5) to an interior 106 of loop 102. Carabiner 100 also comprises a mounting 108 enabling connection of carabiner 100 to an environmental object (e.g., the stationary supports shown in FIGS. 3A, 3B, 4, and 5) while maintaining orientation of loop 102 relative to the environmental object. Mounting 108 is configured to engage the environmental object and to lock loop 102 in a selected one of different orientations of loop 102 relative to the environmental object.

Turning momentarily to FIG. 3B, carabiner 100 is shown holding a rod-like object 10 in an upright or vertical position. The term rod-like signifies that the subject object generally has a configuration of a rod despite lands, grooves, projections, and other minor features departing from a pure cylindrical rod configuration. For example, a monopod, which can be used in various applications including for mounting expensive equipment to such as a camera, would certainly fit within the rod-like subject matter the present device would be intended to secure. To that end, in the figures, the rod-like device 10 is a monopod stand. Carabiner 100 is mounted to a tabletop 12 by a clamp 14 including a vertical post 16. Vertical post 16 has been passed through a socket 110 of mounting 108. Mounting 108 may enable a plurality of discrete orientations of loop 102 to the environmental object. Referring also to FIG. 3A, the discrete orientations include a first orientation wherein loop 102 is horizontal when mounting 108 is secured to a horizontal rod 18 (FIG. 3A), and a second orientation wherein loop 102 is horizontal when mounting 108 is secured to vertical rod 16 (FIG. 3B). FIGS. 3A and 3B therefore illustrate two commonly desired mountings of loop 102, wherein the environmental object is horizontal, and where the environmental object is horizontal. FIG. 3A illustrates mounting to a vertical pole 20 via a clamp device 22 including horizontal rod 18.

FIG. 3B illustrates the second commonly used mounting, wherein clamp 14 engages a horizontal object (i.e., tabletop 12), and engages carabiner 100 via vertical post 16.

Unless otherwise indicated, the terms "first", "second", etc., are used herein merely as labels, and are not intended to impose ordinal, positional, or hierarchical requirements on the times to which these terms refer. Moreover, reference to, e.g., a "second" item does not either require or preclude the existence of, e.g., a "first" or lower-numbered item, and/or, e.g., a "third" or higher-numbered item.

If desired, mounting 108 could be made to encompass a continuum of different or variable orientations.

In the examples of FIGS. 3A and 3B, the environmental object (i.e., post 16) is rod-like, and mounting 108 comprises a plurality of sockets 110, 112 configured to receive the environmental object. In the illustrated examples, at least two of the plurality of sockets 110, 112 are perpendicular to one another. Notably, socket 110 is vertical (i.e., having a vertical central axis) when loop 102 is horizontal, and socket 112 is horizontal when loop 102 is horizontal. This arrangement allows loop 102 to be horizontal, thereby accommodating holding rod-like object 10 erect regardless of whether the supporting environmental object (e.g., post 16) is vertical or horizontal.

Figure 2:
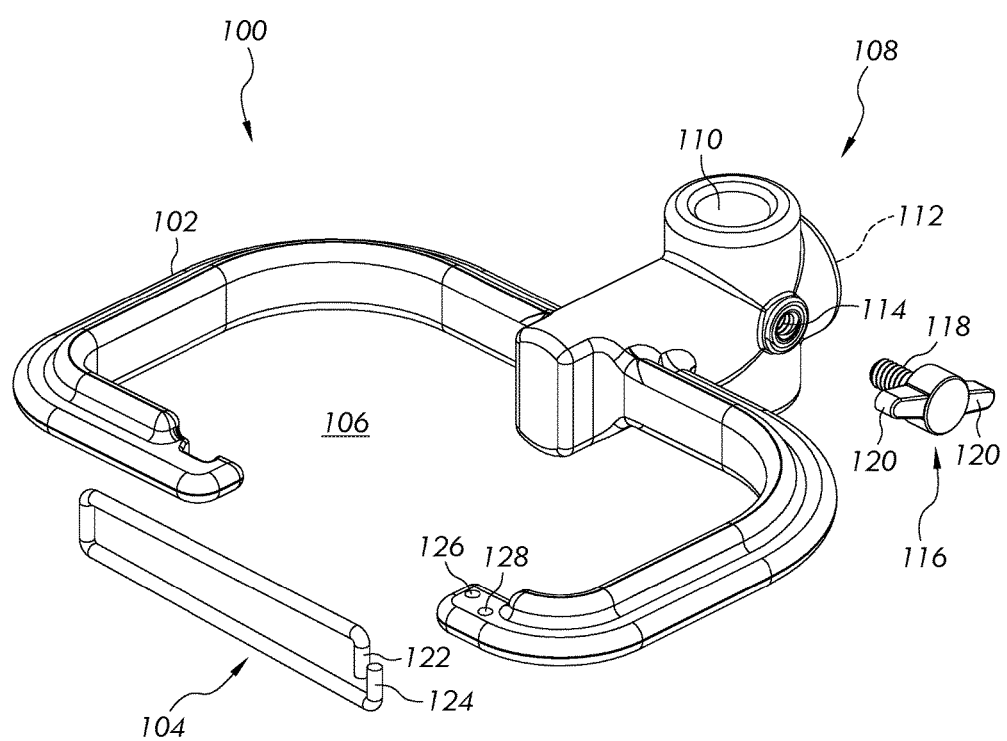
FIG. 2 is an exploded perspective view of FIG. 1.

Sockets 110, 112 engage their associated environmental objects by clamping action. Referring particularly to FIG. 2, mounting 108 may further comprise a threaded hole 114 opening to all of the sockets 110, 112, and a setscrew 116 engageable with threaded hole 114. This arrangement enables a single setscrew 116 to pin an environmental object such as post 16 within any selected socket 110 or 112. Setscrew 116 may comprise a threaded shaft 118 and wings 120 projecting from threaded shaft 118. Wings 120 enable setscrew 116 to be readily tightened and loosened by hand.

Referring particularly to FIG. 2, gate 104 may be spring or tension loaded to close loop 102. This is accomplished by forming gate 104 from an elastic material such as spring steel, and having gate terminals 122, 124 offset from the length of gate 104 such that when gate terminals 122, 124 are inserted into respective holes 126, 128 in loop 102, spring or tension action urges gate 104 into the position shown in FIG. 1. This spring or tension action is sufficient to close gate 104 if not acted on by an outside force. However, as shown in FIG. 4, gate 104 will yield to rod-like object 10 when the latter is moved in the direction indicated by arrows A. Once rod-like object 10 clears gate 104, the latter will spontaneously close, entrapping rod-like object 10 within interior 106 of loop 102, as shown in FIG. 5. In FIG. 5, it becomes apparent that 20 is a portion of a tripod stand 24. Rod-like object 10 is therefore held at the ready, capable of immediate retrieval, should it become necessary to use rod-like object 10.

While the above description has recited vertical and horizontal orientations, it will be recognized that still other orientations may be used with novel carabiner 100. Sockets such as sockets 110, 112, or other corresponding engagement arrangements for engaging environmental objects which may be substituted for or used in addition to sockets 110, 112, may be oriented other than vertically and horizontally and essentially if the mounting 108 is rotated some degree about the mounting environment, the position to which the loop 102 is secured at could encompass a continuum of different or variable orientations.

While the disclosed concepts have been described in connection with what is considered the most practical and preferred implementation, it is to be understood that the disclosed concepts are not to be limited to the disclosed arrangements, but are intended to cover various arrangements which are included within the spirit and scope of the broadest possible interpretation of the appended claims so as to encompass all modifications and equivalent arrangements which are possible.

I claim:

1. A carabiner providing variable mounting positions relative to a stationary support, the carabiner comprising:
   a loop including a gate movable to pass objects to an interior of the loop; and
   a mounting enabling connection of the carabiner to a rod-shaped environmental object while maintaining orientation of the loop relative to the rod-shaped environmental object, wherein the mounting is configured to engage the rod-shaped environmental object and to lock the loop in a selected one of different orientations of the loop relative to the rod-shaped environmental object, wherein the mounting enables a plurality of discrete orientations of the loop to the rod-shaped environmental object, and the mounting comprises a plurality of sockets configured to receive the rod-shaped environmental object, and wherein the mounting further comprises a threaded hole opening to all of the sockets, and a setscrew engageable with the threaded hole.

2. The carabiner of claim 1, wherein the discrete orientations include:
   a first orientation wherein the loop is horizontal when the mounting is secured to a horizontal rod-shaped environmental object; and
   a second orientation wherein the loop is horizontal when the mounting is secured to a vertical rod-shaped environmental object.

3. The carabiner of claim 1, wherein at least two of the plurality of sockets are perpendicular to one another.

4. The carabiner of claim 1, wherein the gate is spring loaded to close the loop.

5. A carabiner providing variable mounting positions relative to a stationary support, the carabiner comprising:
   a loop including a gate movable to pass objects to an interior of the loop; and
   a mounting enabling connection of the carabiner to a rod-shaped environmental object while maintaining orientation of the loop relative to the rod-shaped environmental object, wherein the mounting is configured to engage the rod-shaped environmental object and to lock the loop in a selected one of different orientations of the loop relative to the rod-shaped environmental object, wherein the mounting enables a plurality of discrete orientations of the loop to the rod-shaped environmental object, and the mounting comprises a plurality of sockets configured to receive the rod-shaped environmental object, and wherein the mounting further comprises a threaded hole opening to all of the sockets, and a setscrew engageable with the threaded hole, wherein the setscrew comprises a threaded shaft and wings projecting from the threaded shaft.

* * * * *